(12) United States Patent
Linton et al.

(10) Patent No.: US 10,984,108 B2
(45) Date of Patent: Apr. 20, 2021

(54) TRUSTED COMPUTING ATTESTATION OF SYSTEM VALIDATION STATE

(71) Applicant: INTERNATIONAL BUSINESS MACHINES CORPORATION, Armonk, NY (US)

(72) Inventors: Jeb R Linton, Manassas, VA (US); Warren W. Grunbok, Poughkeepsie, NY (US); Harmeet Singh, Gaithersburg, MD (US)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 16/152,870

(22) Filed: Oct. 5, 2018

(65) Prior Publication Data

US 2020/0110879 A1 Apr. 9, 2020

(51) Int. Cl.
*G06F 7/575* (2006.01)
*G06F 21/57* (2013.01)

(52) U.S. Cl.
CPC ...... *G06F 21/575* (2013.01); *G06F 2221/033* (2013.01)

(58) Field of Classification Search
CPC .................. G06F 21/575; G06F 2221/033
See application file for complete search history.

(56) References Cited

U.S. PATENT DOCUMENTS

| | | | |
|---|---|---|---|
| 5,956,408 A * | 9/1999 | Arnold | G06F 21/10 713/1 |
| 6,466,048 B1 | 10/2002 | Goodman | |
| 7,308,635 B2 | 12/2007 | Bancel et al. | |
| 7,493,483 B2 * | 2/2009 | McIntosh | G06F 9/30145 713/190 |
| 7,921,303 B2 | 4/2011 | Mauro, II | |
| 8,127,146 B2 | 2/2012 | Thom et al. | |
| 8,789,037 B2 | 7/2014 | De Atley et al. | |
| 9,015,456 B1 * | 4/2015 | Spangler | G06F 9/4403 711/100 |
| 9,055,491 B2 * | 6/2015 | Jung | H04W 36/0072 |
| 9,224,012 B2 | 12/2015 | Wu | |
| 9,230,129 B1 | 1/2016 | Mao et al. | |
| 9,317,276 B2 * | 4/2016 | Gilbert | G06F 8/65 |
| 10,505,920 B2 * | 12/2019 | Kumar | G06F 21/57 |

(Continued)

OTHER PUBLICATIONS

Yoder, Kent, "UEFI Secure Boot and the TPM: Contig Data," IBM DeveloperWorks, Apr. 10, 2013.

(Continued)

*Primary Examiner* — Aurel Prifti
(74) *Attorney, Agent, or Firm* — Stephen R. Yoder (57) ABSTRACT

A trusted computing environment may be dynamically certified by providing a selectable boot option that controls running a loadable boot image in one of a test mode and a production mode. The test mode may automate running a processing standard validation test to obtain a processing standard validation test result. Responsive to running the processing standard validation test with a successful test result, a record indicating the successful test result and the loadable boot image is stored within the trusted computing environment, utilizing a certification process. Responsive to running the production mode, the trusted computing environment and the loadable boot image may be loaded.

20 Claims, 6 Drawing Sheets

(56) References Cited

U.S. PATENT DOCUMENTS

| | | | |
|---|---|---|---|
| 10,565,382 B1* | 2/2020 | Diamant | G06F 21/575 |
| 2003/0204801 A1 | 10/2003 | Tkacik et al. | |
| 2005/0169076 A1 | 8/2005 | Bancel et al. | |
| 2009/0037722 A1* | 2/2009 | Chong | G06F 9/441 |
| | | | 713/2 |
| 2009/0296933 A1 | 12/2009 | Akselrod et al. | |
| 2010/0042824 A1* | 2/2010 | Lee | H04L 9/0844 |
| | | | 713/2 |
| 2011/0173693 A1* | 7/2011 | Wysopal | G06F 21/577 |
| | | | 726/19 |
| 2012/0166780 A1* | 6/2012 | Ziarnik | G06F 1/24 |
| | | | 713/1 |
| 2013/0173898 A1* | 7/2013 | Berg | H04L 63/123 |
| | | | 713/2 |
| 2013/0174220 A1* | 7/2013 | Berg | H04L 63/123 |
| | | | 726/3 |
| 2013/0191622 A1* | 7/2013 | Sasaki | G06F 9/4406 |
| | | | 713/2 |
| 2014/0026124 A1* | 1/2014 | Gilbert | G06F 8/70 |
| | | | 717/124 |
| 2014/0149492 A1* | 5/2014 | Ananthanarayanan | G06F 9/5072 |
| | | | 709/203 |
| 2014/0189340 A1* | 7/2014 | Hadley | G06F 21/54 |
| | | | 713/2 |
| 2014/0317394 A1* | 10/2014 | Buhler | G06F 9/4416 |
| | | | 713/2 |
| 2014/0331037 A1* | 11/2014 | Lewis | G06F 9/4401 |
| | | | 713/2 |
| 2015/0294250 A1* | 10/2015 | Anerousis | G06Q 10/0635 |
| | | | 705/7.28 |
| 2016/0125187 A1* | 5/2016 | Oxford | H04L 63/123 |
| | | | 713/2 |
| 2017/0147361 A1* | 5/2017 | Kirvan | G06F 9/4406 |
| 2018/0157840 A1* | 6/2018 | Crowley | H04L 9/14 |
| 2018/0181759 A1* | 6/2018 | Smith | G06F 9/4416 |
| 2019/0034321 A1* | 1/2019 | Martin | G06F 11/3696 |
| 2019/0065750 A1* | 2/2019 | Bolan | H04L 9/3247 |
| 2019/0102556 A1* | 4/2019 | Case | G06F 9/4406 |
| 2019/0356529 A1* | 11/2019 | Gulati | H04L 9/3268 |

OTHER PUBLICATIONS

Peeters, Eric, "SoC Security Architecture: Current Practices and Emerging Needs," Proceedings of the 52nd Annual Design Automation Conference. ACM, Jun. 2015.

* cited by examiner

TRUSTED COMPUTING ATTESTATION OF SYSTEM VALIDATION STATE

BACKGROUND

In many computing environments, users may need to verify that a cryptographic status of a computing system conforms to certain strict standards. For example, for applications that access highly sensitive information (e.g., information relating to national security, highly sensitive personal information), users may be required (e.g., by contract) to verify that the computing system conforms to strict requirements of cryptographic status.

SUMMARY

According to one aspect, a trusted computing environment may be dynamically certified by providing a selectable boot option that controls running a loadable boot image in one of a test mode and a production mode. The test mode may automate running a processing standard validation test to obtain a processing standard validation test result. Responsive to running the processing standard validation test with a successful test result, a record indicating the successful test result and the loadable boot image is stored within the trusted computing environment, utilizing a certification process. Responsive to running the production mode, the trusted computing environment and the loadable boot image may be loaded.

A method, system, and computer program product are provided for dynamically certifying the trusted computing environment.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

The present disclosure relates to validating a cryptographic status of a computing system and storing metadata regarding that status in immutable key protected storage. More specifically, the present disclosure relates to trusted computing attestation of system validation state.

As an example, Federal Information Processing Standard 140-2 (FIPS 140-2) validation is a program managed by the National Institute of Standards and Technology (NIST) to accredit cryptographic functions in a security system. Such accreditation may include a complex and expensive process requiring strict definition of the system being accredited including, for example, only a specific release of hardware running only a specific cryptographic library in a specified mode.

When a stand alone system and its cryptographic capabilities are undergoing FIPS testing, there are a number of requirements of a hardware vendor in order to meet the test requirements. For example, the platform specification may be integral to the validation process, in accordance with the Derived Test Requirements document for FIPS testing. In a cloud environment this may be more difficult, particularly when a work load requires a FIPS validated environment. In order to provide attestation of FIPS validation, a Cloud provider may initiate complex paperwork and process controls to demonstrate regulatory compliance.

Example techniques discussed herein may advantageously provide a mechanism for challenging a system directly or indirectly and receiving an attestation of FIPS validation, automatically.

As used herein, "Trusted Computing" refers to a set of methods of creating a Hardware-rooted Chain of Trust which enables a high assurance attestation of predetermined characteristics of the system. Example techniques discussed herein may advantageously apply Trusted Computing to attest FIPS validation. In the context of this disclosure, a hardware rooted chain of trust may be created so that a software stack of any type may be checked using a piece of hardware that may not be updated. For example, each layer in the chain checks to ensure that the hash of the next level assures that level has not been tampered with.

Providing a strong hardware-rooted attestation of FIPS validation in realtime may advantageously improve performance in computing environments such as Cloud environments because FIPS validation may be required by many regulatory regimes including FedRAMP, HIPAA, and others.

As discussed in more detail below, a system and method can be used for any type of device or application. The system and method automatically obtains a cryptographic status of a computing system and stores metadata indicating the status in immutable key protected storage. The status may then be checked by sending a request to the immutable key protected storage. In this way, attestation of the cryptographic status may be relied on, as the status may not be tampered with by rogue intruders and/or by inappropriate code. Further, since the status is stored in immutable key protected storage on the device itself, there is no need to re-certify with a third party certifier every time the computing system is deployed.

Figure 1A:
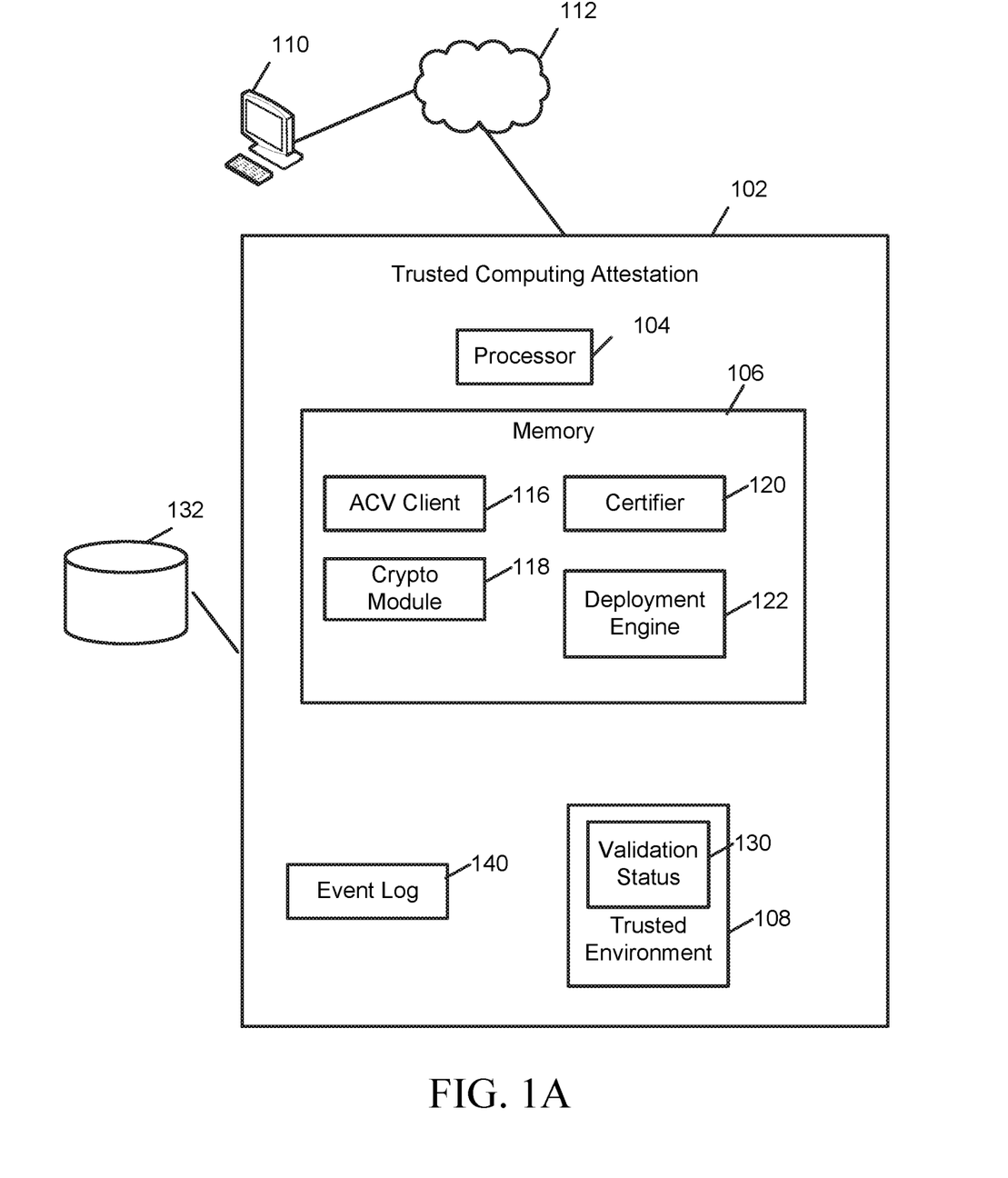
FIG. 1A is a schematic diagram of an embodiment of a system for trusted computing attestation of system validation state.

For example, FIG. 1A shows an example embodiment of a system 100 for trusted computing attestation of system validation state. As shown in the embodiment of FIG. 1, a trusted computing attestation system 102 includes a processor 104, a memory 106 storing components of computing attestation system 102, and a trusted environment 108 that stores an indication of a validation status 130. For example, memory 106 may include a computer readable storage medium, as discussed further below. For example, trusted environment 108 may include an immutable password protected storage medium (e.g., a Trusted Platform Module (TPM)) that securely stores validation status 130. System 102 may communicate with a device 110, for example, to receive certifications of validation states. For example, system 102 may communicate with device 110 via a network 112. In some embodiments, network 112 may be a wide area network ("WAN"), e.g., the Internet. In other embodiments, network 112 may be a local area network ("LAN"). For example, in a more remote location far from a metropolitan area, the Internet may not be available. In yet other embodiments, network 112 may be a combination of a WAN and a LAN. For example, device 110 may provide automated cryptography validation.

As shown in FIG. 1A, system 102 may include an automated cryptography validation (ACV) client 116, a cryptographic module 118, a certifier 120, and a deployment engine 122. For example, ACV client 116 may communicate with an ACV server that offers validation as a service, to obtain a result of validation of a system, for example, for cryptographic module 118. For example, cryptographic module 118 may include code and/or libraries for performing cryptographic operations. For example, certifier 120 may be initiated to obtain attestations of validation, for example, of cryptographic module 118. For example, certifier 120 may be initiated at boot time to initiate running a loadable boot image in either a test mode or a production mode. In some embodiments, the test mode may automate running a processing standard validation test to obtain a processing standard validation test result. For example, the test mode may automate running FIPS validation for cryptographic module 118, via ACV client 116.

In some embodiments, as part of a system update procedure, a system may determine whether any crypto modules are impacted by the update. Once the update is complete, an automated test may be initiated for any impacted crypto modules. For example, TIVOLI ENDPOINT MANAGER or YUM update (e.g., on a LINUX system) may be able to initiate such an automated test. For example, when a positive result is returned, that module may have a privilege to update the immutable storage (e.g., via a TPM extend operation) with the appropriate information.

In some embodiments, responsive to running the processing standard validation test with a successful test result, a record indicating the successful test result and the loadable boot image may be stored within the trusted computing environment, utilizing a certification process. For example, certifier 120 may receive results of the validation test via ACV client 116, and may store the record (e.g., metadata indicating a successful test result) as validation status 130 in trusted environment 108. For example, certifier 120 may receive results that have been encrypted using a hash, and may utilize that hash in storing validation status 130 in trusted environment 108. For example, certifier 120 may store validation status 130 using an extend operation to set at least one Platform Configuration Register (PCR) in a TPM, to securely and immutably indicate validation status 130. For example, using a PCR extend operation, each time a PCR is updated, a hash of the previous value is "anded" with a hash of the current value (using a logical "AND" operation). For example, a hash may include a hash of the results of an automated Cryptographic Algorithm Validation System (CAVS) test submitted to an Automated Cryptography Validation Protocol (ACVP) backend system.

An event log 140 may store information indicating sequencing of operations within system 102. For example, event log 140 may store associated sequencing indicators (e.g., timestamps) with system events or other operations such as modifying cryptographic module 118 and/or storing a current validation status 130 in trusted environment 108. In this way, validations of cryptographic module 118 (and other events) may be tracked over time, sequenced in temporal order of storing current validations in trusted environment 108 over time. Thus, a user may verify, for example, that cryptographic module 118 was modified, and was re-certified, to ensure that validation is current with a current (modified) state of cryptographic module 118, thus obviating a need to re-certify cryptographic module 118 with a third party attestation service for every new deployment.

A repository 132 may store data that may be processed by system 102.

This disclosure describes example techniques to ensure FIPS 140-2 validation may be guaranteed, through a standards-based attestation based on a hardware-rooted chain of trust. Some embodiments may include a node in a Cloud or Internet of Things (IoT) infrastructure, to enable sensitive and/or regulated secure workloads to be run with assured security policy compliance. As used herein, the "internet of things," or IoT, refers to a system of interrelated computing devices, mechanical and digital machines, objects, animals or people that are provided with unique identifiers (UIDs) and the ability to transfer data over a network without requiring human-to-human or human-to-computer interaction.

The present disclosure may provide a mechanism for performing strong attestation of the FIPS 140-2 validation state of a computer system, using Trusted Computing. In some embodiments, at the time of system provisioning (into the cloud or otherwise), a selectable option may be provided in the Basic Input/Output System (BIOS) (or initial boot layer) instructing the system to enable FIPS mode. In response to selection of this option, the system may initiate a process of running an automated test suite (discussed further below) to determine that the system is on a list of specific systems for which a FIPS 140-2 validation has been performed, and/or is in a specific configuration covered within the boundaries of the FIPS validation. For example, at boot time, a user may activate an "F1" function (e.g., by pressing or selecting an "F1" key) to view a set of selectable options, including a selectable option for initiating the running of tests to set a value in immutable storage (e.g., a TPM) indicating the results of the tests (discussed further below).

In some embodiments, once the system passes the test suite, a certificate may be issued either by NIST or a Trusted Vendor (as discussed further below). The certificate may then be stored in a TPM PCR of the system so that it may later be used by an attestation software layer. In some embodiments, additional information such as the set of libraries validated, configuration information for the test and any system limitations relevant to the FIPS validation may also be stored.

In an embodiment, the automated test suite may be performed online. For example, a connection to an automated test suite server (at NIST or a Trusted Vendor) may be initiated, in accordance with a specification established by NIST or the Trusted Vendor.

In an embodiment, the automated test suite may be performed offline. For example, a cached list of validated configurations may be stored on a removable storage medium, signed by NIST or a Trusted Vendor and verifiable using cached certificates on the local system (e.g., public key infrastructure (PKI) methods).

In an embodiment, once the system has this information stored in the TPM, attesting the FIPS state may be made a part of the Trusted Boot of the system. For example, when a work load specifies to cloud management software that it requires a FIPS validated cryptographic module, the management software may use the trusted computing stack to query the TPM for FIPS state. The request may then obtain the PCR state and the test parameters and capabilities from the TPM.

In a Cloud embodiment, the provisioning system and accompanying user-facing application programming interfaces (APIs) and user interfaces (UIs) may provide a mechanism for users to specify the FIPS 140-2 validation option as a requirement. For example, the provisioning system may maintain a database of validated systems, and an attestation may be performed at provisioning time. In some embodiments, if work load requirements and system capabilities align properly for a particular server, the system may then place the work load on that server.

In accordance with example techniques discussed herein, a system that has undergone a validation (e.g., a FIPS validation) may demonstrate programmatically that it remains a validated configuration (e.g., a FIPS validated configuration) after a service stream is applied. For example, a system may report its ability to pass FIPS tests in real time, given an interaction with NIST testing. An interaction with CMVP servers of NIST may test the integrity of a cryptographic module, and the techniques discussed herein may report that in a cloud environment. For example, storing the FIPS validation state in immutable storage such as a TPM chip may advantageously prevent tampering of the state by hackers, or by inadvertent malicious code.

Figure 1B:
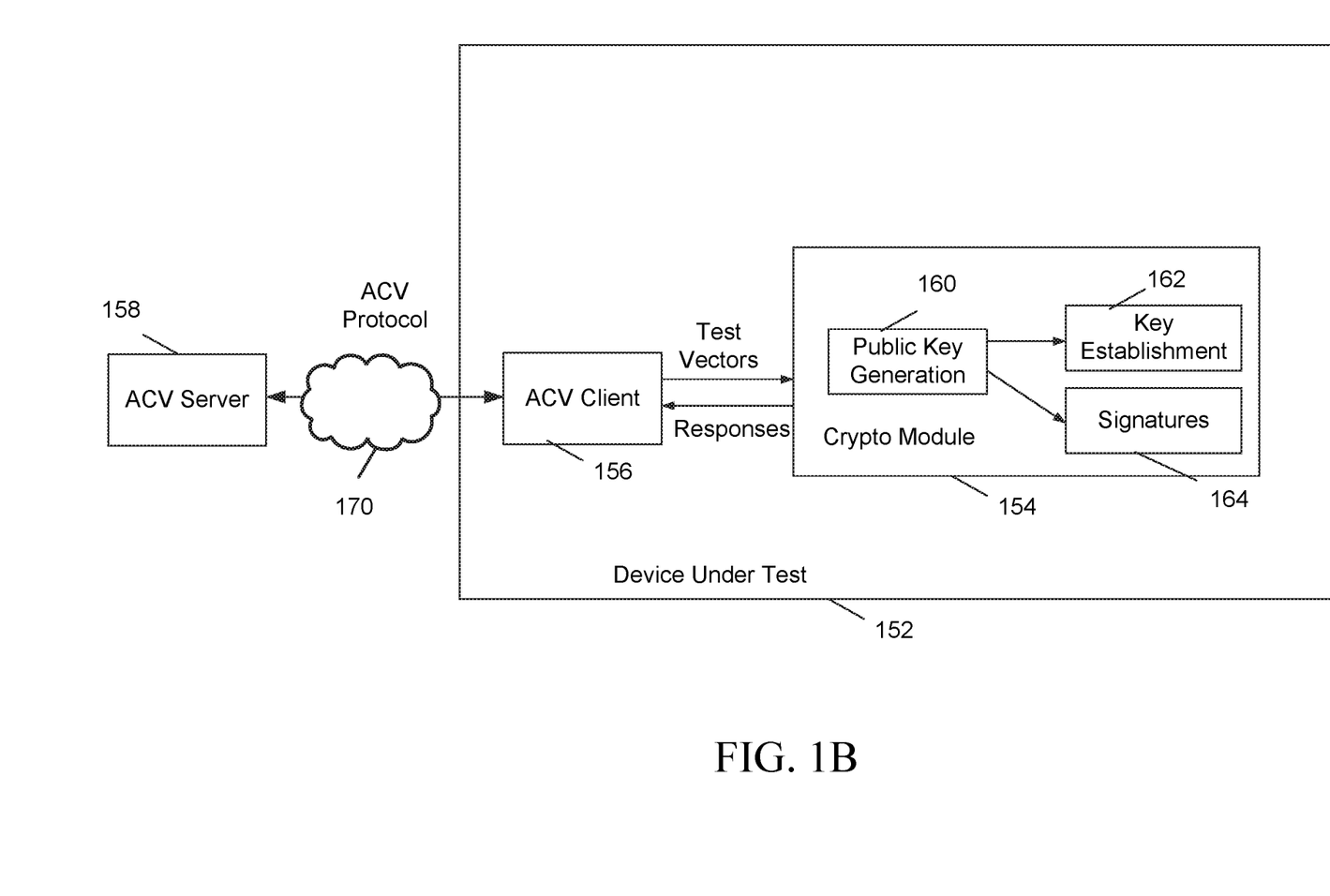
FIG. 1B is a schematic diagram of a system for automated cryptography validation.

FIG. 1B is a schematic diagram of a system for automated cryptography validation. As shown in FIG. 1B, a device under test 152 may include a crypto module 154 and an ACV client 156. For example, crypto module 154 may operate similarly as crypto module 118 of FIG. 1A, and ACV client 156 may operate similarly as ACV client 116 of FIG. 1A. For example, crypto module 154 may include a public key generation module 160, with key establishment 162 and signatures 164. As discussed above, a user may request validation of a set of cryptography libraries included in crypto module 154, and may also request attestation of a validation state of crypto module 154.

As shown in FIG. 1B, device under test 152 may communicate with an Automated Cryptography Validation (ACV) server 158 via ACV client 156, using an ACV protocol. For example, ACV server 158 may include an automated test suite server (at NIST or a Trusted Vendor), as discussed above. As shown in FIG. 1B, as part of testing, ACV client 156 may send test vectors to device under test 152, and may receive response therefrom, to communicate the information with ACV server 158.

In some embodiments, ACV server 158 may include a web hosted service. For example, ACV server 158 may generate test vectors (e.g., JavaScript Object Notation (JSON) test vectors), and/or may convert Cryptographic Algorithm Validation System (CAVS) vectors to JSON. ACV server 158 may perform results verification.

In some embodiments, ACV client 156 may be integrated into device under test 152. For example, ACV client 156 may convert JSON test vectors from ACV server 158 into a predetermined format that is usable by the crypto module 154 under test (i.e., in device under test 152). For example, ACV client 156 may return known-answer test (KAT) answers (e.g., from the responses from crypto module 154) to ACV server 158, after converting them to JSON format.

An example Trusted Vendor program may provide a certificate indicating "test passed" similarly as NIST. For example, the certificate may include a digital signature provided either by NIST or a Trusted Vendor.

In such a program, an established vendor may be allowed to self certify its system's cryptographic modules based on defined criteria and past success at certifying cryptographic modules. Thus, if a vendor were a Trusted Vendor, it may run Automated Cryptography Validation Protocol (ACVP) tests itself, issue the certificate indicating "test passed" and store it in a TPM resident on the system.

As another example, if a vendor is not a Trusted Vendor, the vendor could request that NIST provide the certificate once the success record of certificate indicating "test passed" was communicated to NIST. This NIST based certificate could then be stored in the TPM PCR.

In an embodiment, the FIPS validation status may be stored in a Static PCR after validation by the system at boot time, prior to the loading of the operating system (OS). For example, validation characteristics may be stored in readable form using a NVRAM Vault function of the TPM, and the hash stored in the PCR may be used to verify it. For example, one of PCRs 1-16 may be redesignated for this purpose. Using this example technique, the OS may check validation requirements such as specific libraries and configuration parameters (e.g., OpenSSL version n.n.n with the "-FIPS" parameter).

In an embodiment, the system validation state may be checked after OS kernel boot using a runtime library which was itself checked for validity against a boot-time chain of trust. In this case, the validation may then be stored in a Dynamic PCR (e.g., number 17-20) in the TPM for subsequent use by programs.

Attestation of either type of register may use example standard protocols maintained by the Trusted Computing Board and embodied in existing methods/programs/libraries such as OpenAttestation.

Figure 2:
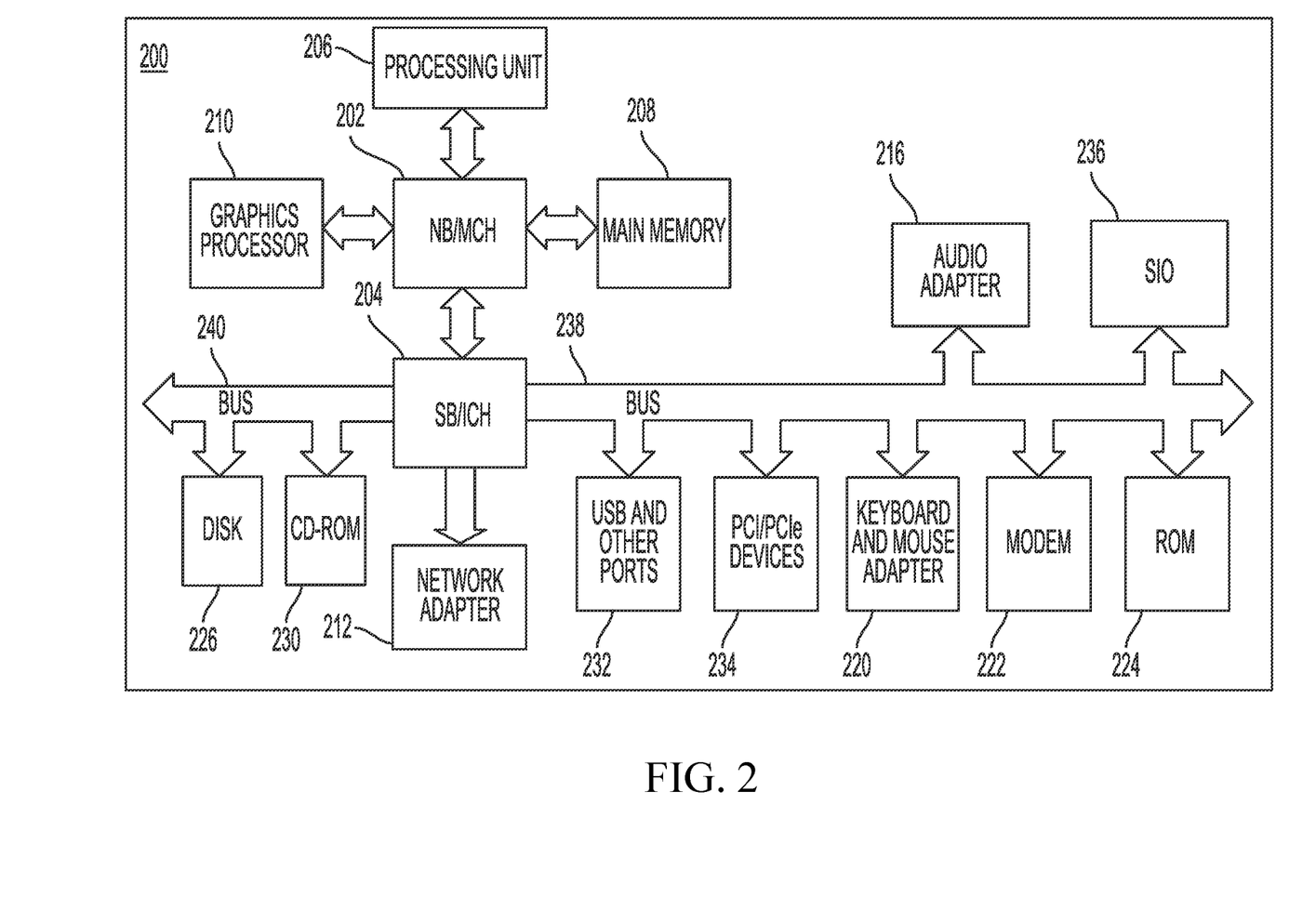
FIG. 2 is a schematic diagram of an embodiment of a hardware system for trusted computing attestation of system validation state.

With reference to FIG. 2, this figure depicts a block diagram of a data processing system in which illustrative embodiments may be implemented. Data processing system 200 is an example of a computer, such as servers, or clients, or another type of device in which computer usable program code or instructions implementing the processes may be located for the illustrative embodiments.

Data processing system 200 is also representative of a data processing system or a configuration therein, in which computer usable program code or instructions implementing the processes of the illustrative embodiments may be located. Data processing system 200 is described as a computer only as an example, without being limited thereto. Implementations in the form of other devices may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX®. (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™. (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

Figure 3:
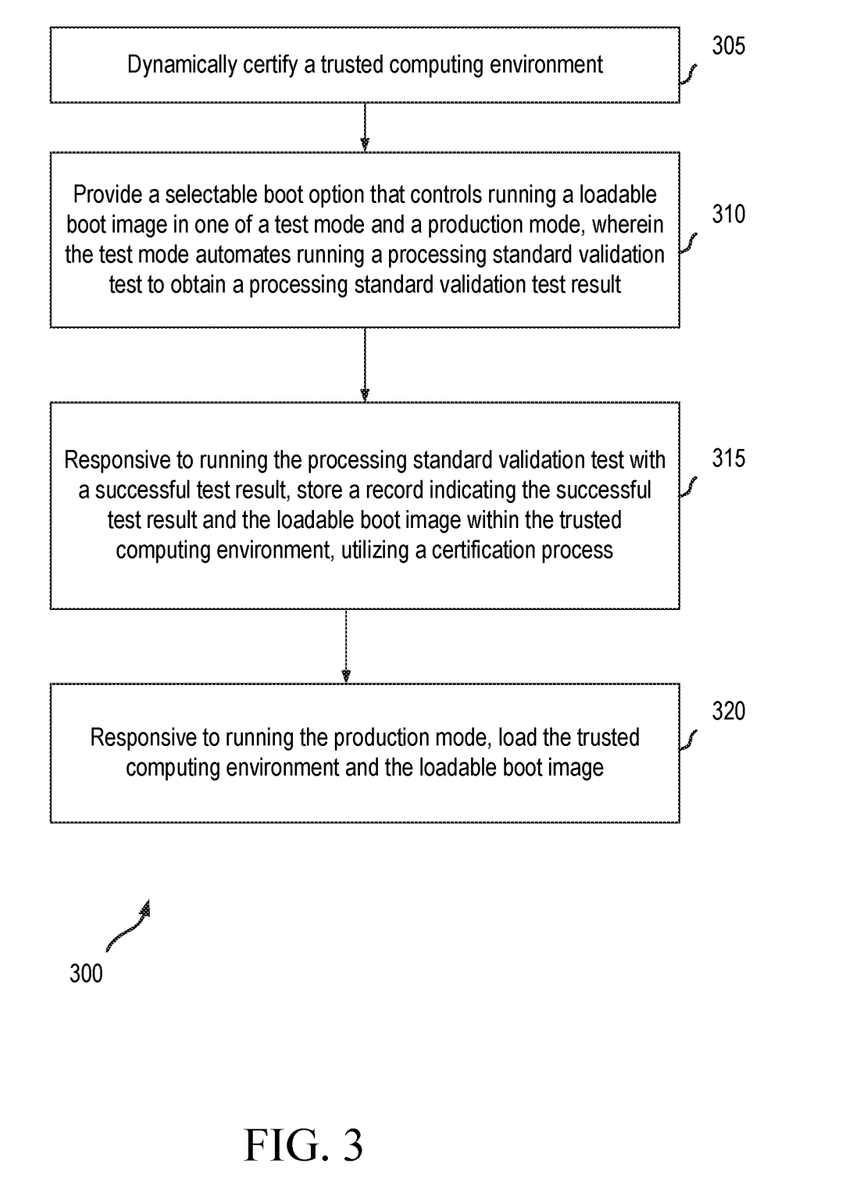
FIG. 3 is a flowchart of an embodiment of trusted computing attestation of system validation state.

FIG. 3 is a flowchart 300 of an embodiment of trusted computing attestation of system validation state. As shown in FIG. 3, in step 305, a trusted computing environment may be dynamically certified. In step 310, a selectable boot option that controls running a loadable boot image in one of a test mode and a production mode may be provided. The test mode may automate running a processing standard validation test to obtain a processing standard validation test result. For example, the processing standard validation test may include a FIPS validation test. In step 315, responsive to running the processing standard validation test with a successful test result, a record indicating the successful test result and the loadable boot image is stored within the trusted computing environment, utilizing a certification process. For example, the record may be stored in immutable password protected storage (e.g., a TPM) resident on a device under test. In step 320, responsive to running the production mode, the trusted computing environment and the loadable boot image may be loaded.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
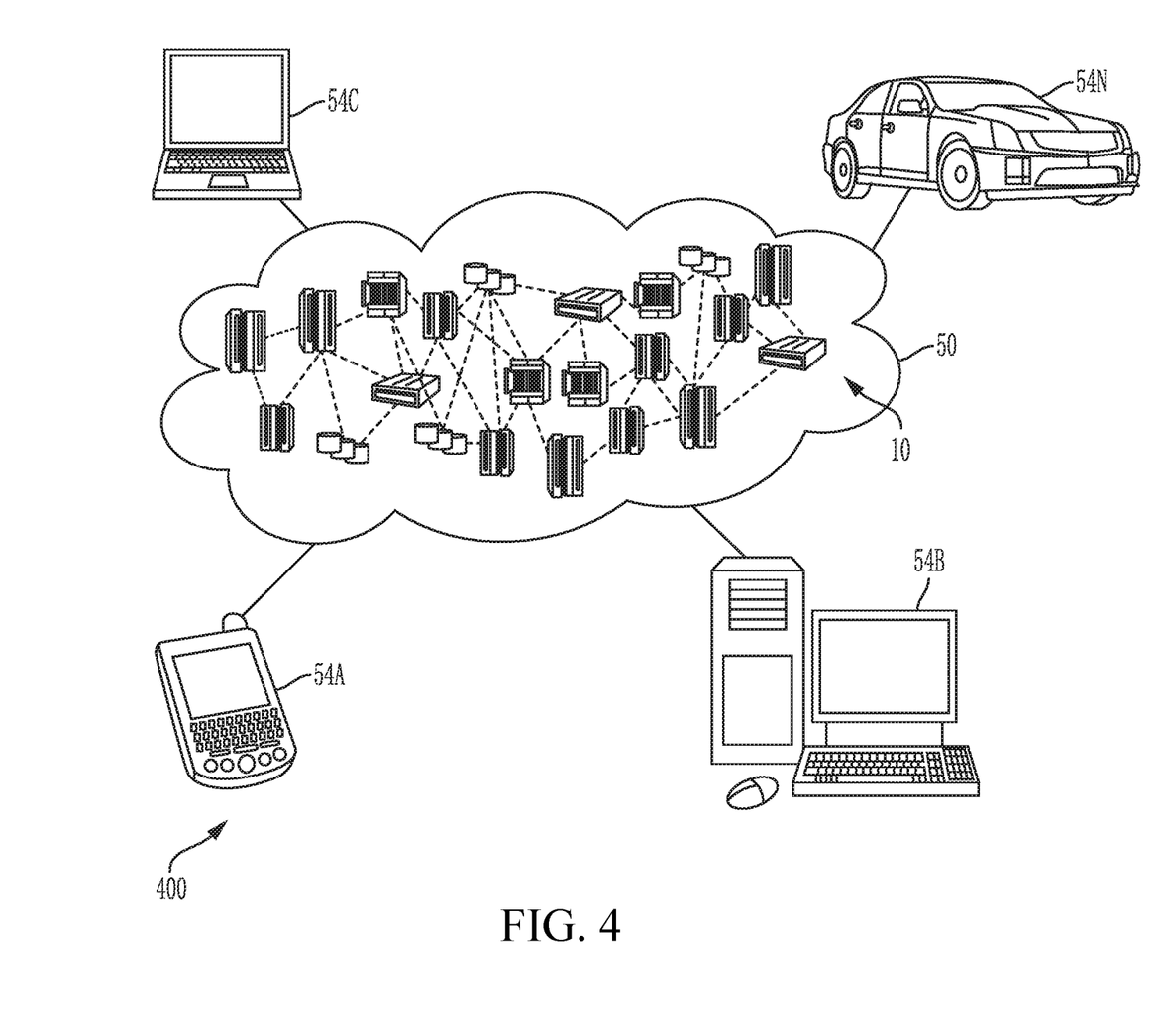
FIG. 4 depicts a cloud computing environment according to an embodiment of the present disclosure.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
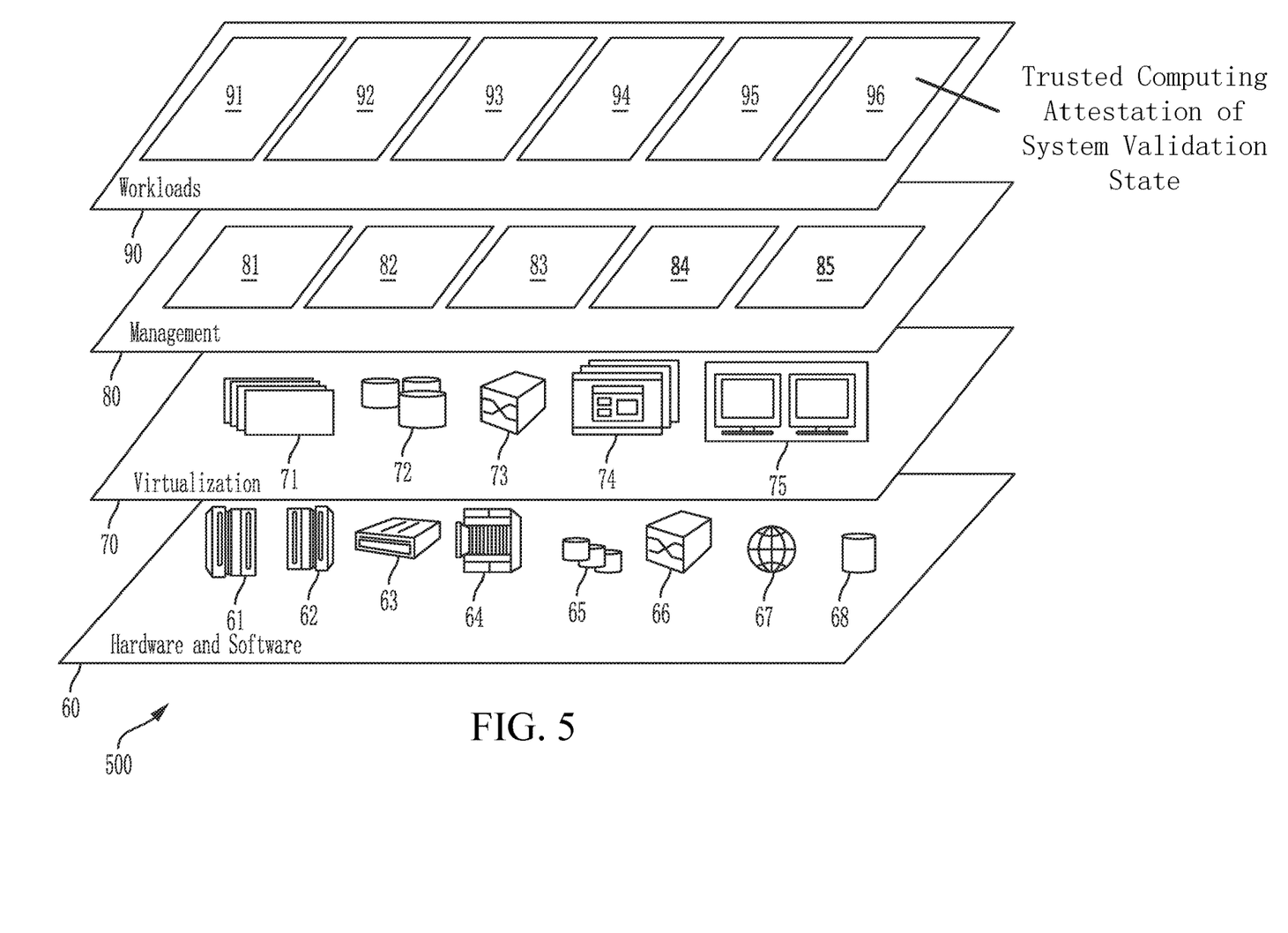
FIG. 5 depicts abstraction model layers according to an embodiment of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95; and trusted computing attestation of system validation state 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for certifying a computing system in a trusted computing environment comprising:
   running, at the time of provisioning the computing system, a loadable boot image in a test mode, wherein the test mode performs a processing standard validation test on the loadable boot image to obtain a processing standard validation test result;
   responsive to receiving a successful test result by running the loadable boot image in the test mode, initiating a certification process for storing a validation status for the computing system;
   storing the validation status in an event log in immutable key protected storage according to the certification process, the validation status including an indication of the running of the processing standard validation test with a record of the successful test result, with a corresponding timestamp, and storing the loadable boot image within the trusted computing environment;
   checking the validation status of the computing system and corresponding loadable boot image by sending a request to the immutable key protected storage; and
   responsive to receiving the validation status, loading, in production mode, the computing system and the loadable boot image in the trusted computing environment.

2. The computer implemented method of claim 1, wherein the loadable boot image is supported on a cloud environment.

3. The computer implemented method of claim 1, wherein the loadable boot image is supported on an Internet of Things (IoT) environment.

4. The computer implemented method of claim 1, wherein the trusted computing environment includes a Trusted Platform Module (TPM).

5. The computer implemented method of claim 1, wherein storing the validation status in an event log includes storing the validation status in a register of a Trusted Platform Module (TPM).

6. The computer implemented method of claim 5, wherein storing the validation status in an event log includes storing the validation status in the TPM utilizing a TPM extend operation.

7. The computer implemented method of claim 1, wherein performing the processing standard validation test on the loadable boot image to obtain the processing standard validation test result includes running a Federal Information Processing Standard (FIPS) validation test to obtain a FIPS test result.

8. The computer implemented method of claim 1, further comprising:
   modifying the computing system;
   dynamically re-certifying the modified computing system by performing the processing standard validation test on the modified computing system to obtain a processing standard validation test result; and
   storing an indication of the modifying and an indication of the re-certifying, with a corresponding timestamp of the re-certifying, in the event log.

9. The computer implemented method of claim 8, further comprising:
   verifying a current certified status of the modified computing system by analyzing the event log and the stored indication of the modifying and an indication of the re-certifying.

10. The system of claim 1, further causing the processor to perform the method comprising:
    modifying the computing system;
    dynamically re-certifying the modified computing system by performing the processing standard validation test on the modified computing system to obtain a processing standard validation test result; and
    storing an indication of the modifying and an indication of the re-certifying, with a corresponding timestamp of the re-certifying, in the event log.

11. The system of claim 10, further causing the processor to perform the method comprising:
    verifying a current certified status of the modified computing system by analyzing the event log and the stored indication of the modifying and an indication of the re-certifying.

12. A system for dynamically certifying a trusted computing environment, the system comprising:
    a device processor; and
    a computer readable storage medium having program instructions stored thereon that are executable by the device processor to dynamically certify a trusted computing environment by cause the processor to perform a method comprising:
    running, at the time of provisioning the computing system, a loadable boot image in a test mode, wherein the test mode performs a processing standard validation test on the loadable boot image to obtain a processing standard validation test result;
    responsive to receiving successful test result by running the loadable boot image in the test mode, initiating a certification process for storing a validation status for the computing system;
    storing the validation status in an event log in immutable key protected storage according to the certification process, the validation status including an indication of the running of the processing standard validation test with a record of the successful test result, with a corresponding timestamp, and storing the loadable boot image within the trusted computing environment;
    checking the validation status of the computing system and corresponding loadable boot image by sending a request to the immutable key protected storage; and
    responsive to receiving the validation status, loading, in production mode, the computing system and the loadable boot image in the trusted computing environment.

13. The system of claim 12, wherein storing the validation status in an event log includes storing the validation status in a Trusted Platform Module (TPM).

14. The system of claim 13, wherein storing the validation status in an event log includes storing the validation status in the TPM, utilizing a TPM extend operation.

15. The system of claim 12, wherein performing the processing standard validation test on the loadable boot image to obtain the processing standard validation test result includes running a Federal Information Processing Standard (FIPS) validation test to obtain a FIPS test result.

16. A computer program product comprising a computer readable storage medium storing instructions that are executable by a device processor to dynamically certify a trusted computing environment by:
    running, at the time of provisioning the computing system, a loadable boot image in a test mode, wherein the test mode performs a processing standard validation test on the loadable boot image to obtain a processing standard validation test result;

responsive to receiving a successful test result by running the loadable boot image in the test mode, initiating a certification process for storing a validation status for the computing system;

storing the validation status in an event log in immutable key protected storage according to the certification process, the validation status including an indication of the running of the processing standard validation test with a record of the successful test result, with a corresponding timestamp, and storing the loadable boot image within the trusted computing environment;

checking the validation status of the computing system and corresponding loadable boot image by sending a request to the immutable key protected storage; and responsive to receiving the validation status, loading, in production mode, the computing system and the loadable boot image in the trusted computing environment.

17. The computer program product of claim 16, wherein storing the validation status in an event log includes storing the validation status in a register of a Trusted Platform Module (TPM).

18. The computer program product of claim 17, wherein storing the validation status in an event log includes storing the validation status in the TPM utilizing a TPM extend operation.

19. The computer program product of claim 16, wherein performing the processing standard validation test on the loadable boot image to obtain the processing standard validation test result includes running a Federal Information Processing Standard (FIPS) validation test to obtain a FIPS test result.

20. The computer program product of claim 16, further dynamically certifying a trusted computing environment by:
    modifying the computing system;
    dynamically re-certifying the modified computing system by performing the processing standard validation test on the modified computing system to obtain a processing standard validation test result; and
    storing an indication of the modifying and an indication of the re-certifying, with a corresponding timestamp of the re-certifying, in the event log.

* * * * *